United States Patent
Buchanan et al.

(10) Patent No.: US 6,801,766 B1
(45) Date of Patent: *Oct. 5, 2004

(54) METHOD AND SYSTEM FOR TRANSMITTING CALL RELATED INFORMATION FROM A TELECOMMUNICATIONS NETWORK TO A PAGER

(76) Inventors: Kenneth Buchanan, 4228 Singing Post La., Roswell, GA (US) 30075; Karl Koster, 5880 Pinebrook Rd., Atlanta, GA (US) 30328

( * ) Notice: Subject to any disclaimer, the term of this patent is extended or adjusted under 35 U.S.C. 154(b) by 100 days.

This patent is subject to a terminal disclaimer.

(21) Appl. No.: 10/093,571

(22) Filed: Mar. 7, 2002

Related U.S. Application Data

(63) Continuation of application No. 08/938,249, filed on Sep. 26, 1997, now Pat. No. 6,393,278.

(51) Int. Cl.[7] .................................................. H04Q 7/20
(52) U.S. Cl. ..................... 455/426.1; 455/415; 455/413
(58) Field of Search ................................ 455/426, 415, 455/458, 413, 414.1, 461, 466, 426.1, 426.2, 412.1, 412.2, 554.1, 554.2, 555, 560; 340/825, 825.36, 825.49

(56) References Cited

U.S. PATENT DOCUMENTS

| | | | | |
|---|---|---|---|---|
| 5,724,409 A | * | 3/1998 | Malik et al. | 379/211.02 |
| 5,740,237 A | * | 4/1998 | Malik et al. | 379/211.02 |
| 5,825,862 A | * | 10/1998 | Voit et al. | 379/142.16 |
| 5,864,612 A | * | 1/1999 | Strauss et al. | 379/142.03 |
| 5,978,672 A | * | 11/1999 | Hartmaier et al. | 455/413 |

* cited by examiner

Primary Examiner—Tony T. Nguyen
(74) Attorney, Agent, or Firm—Walters & Zimmerman; Jennifer Medlin; Todd Mitchem

(57) ABSTRACT

A method and system for sending information to a pager regarding information pertaining to a previously occurring telephone call. After receiving a call offered to a called party, a signal is transmitted from a switch to a service control point, which then obtains transmitted information relating to the call. A signal is transmitted from a service control point to a switch to instruct the switch to process the call. Another signal including the information relating to the call is transmitted preferably from the service control point to a service node and then to a communications service provider. The communications service provider is preferably a paging service provider which transmits a page including the information relating to the call to a pager associated with the called party. The information relating to the call then may be displayed on the pager.

33 Claims, 4 Drawing Sheets

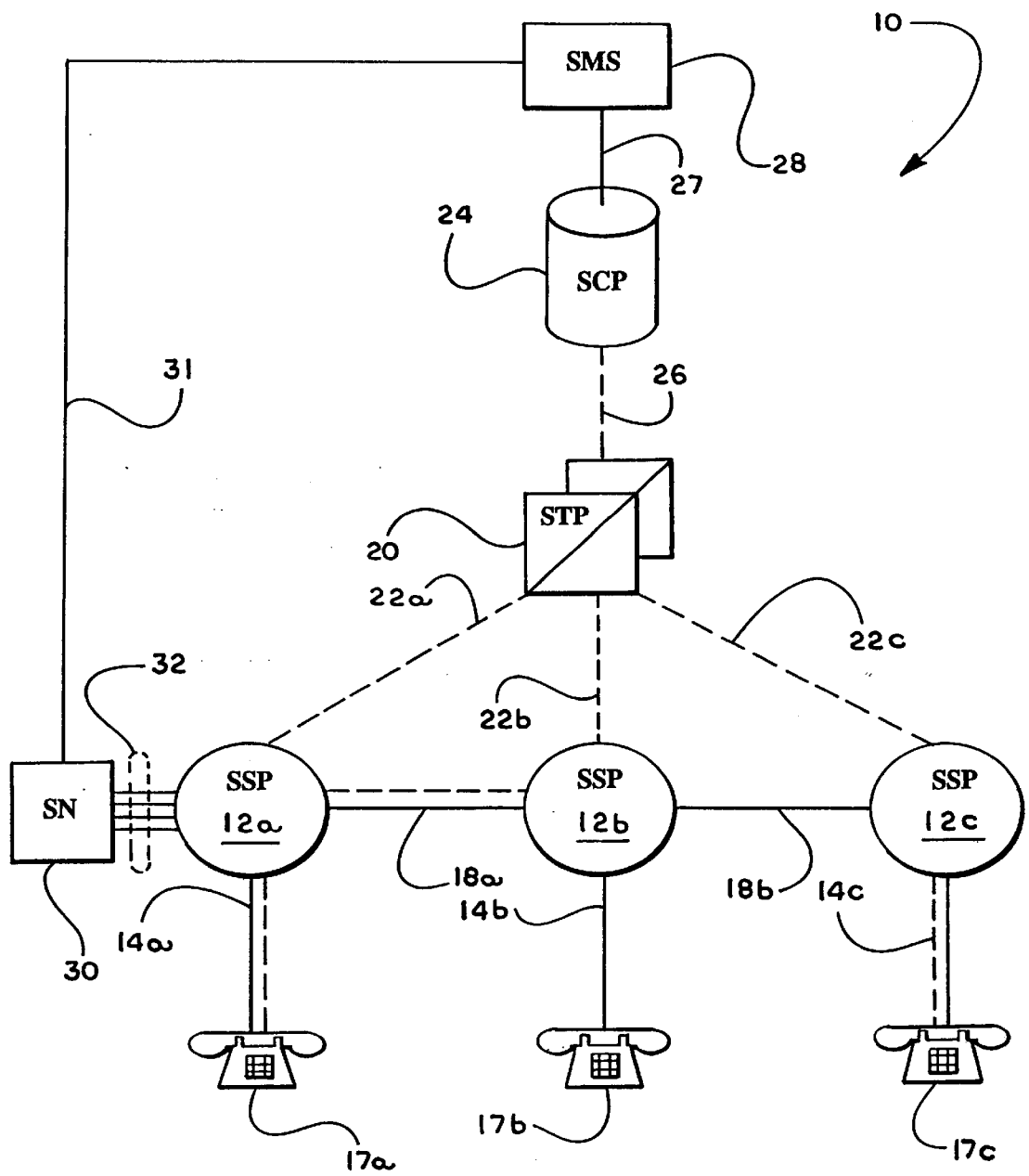
Fig_1

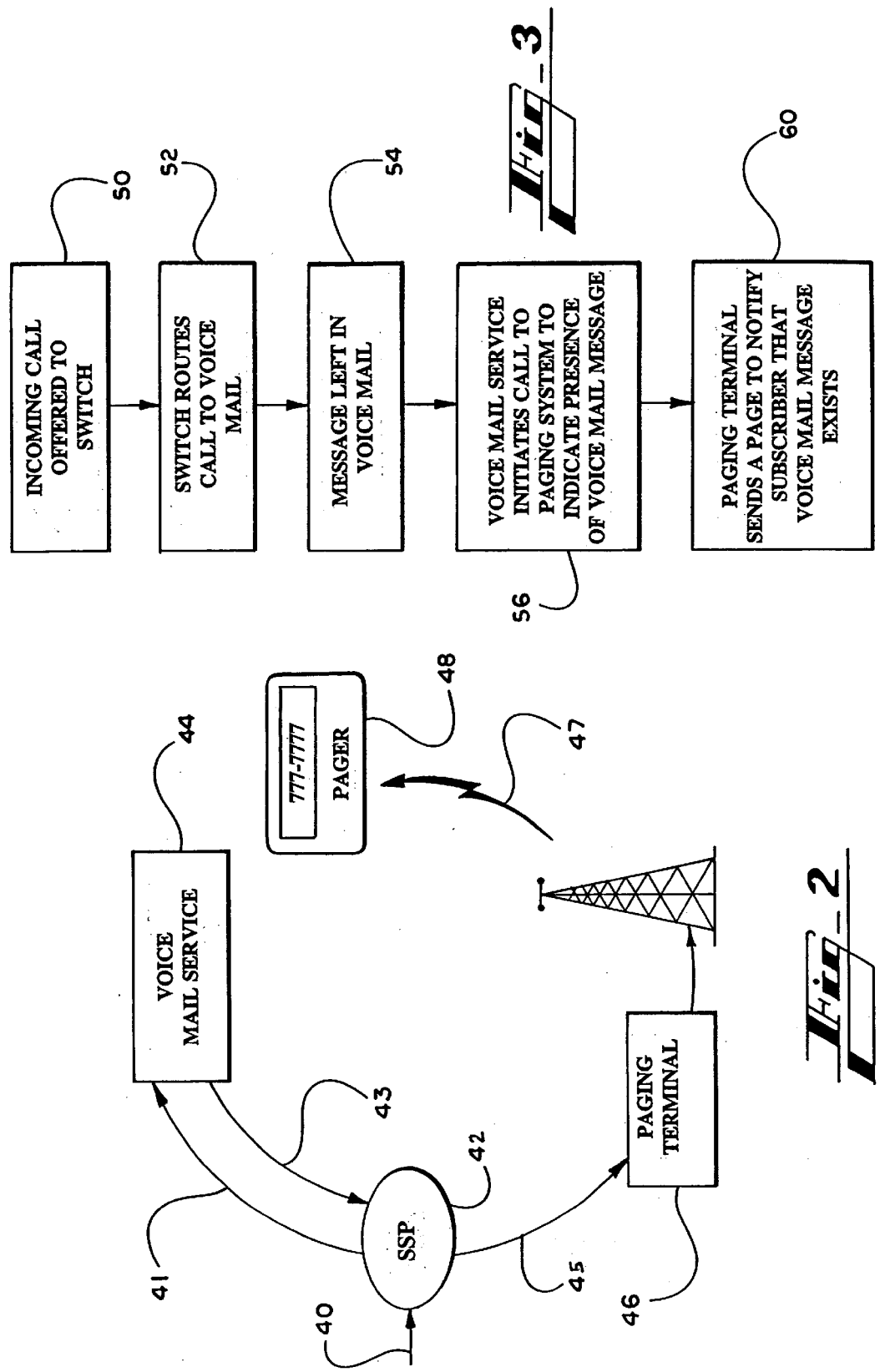

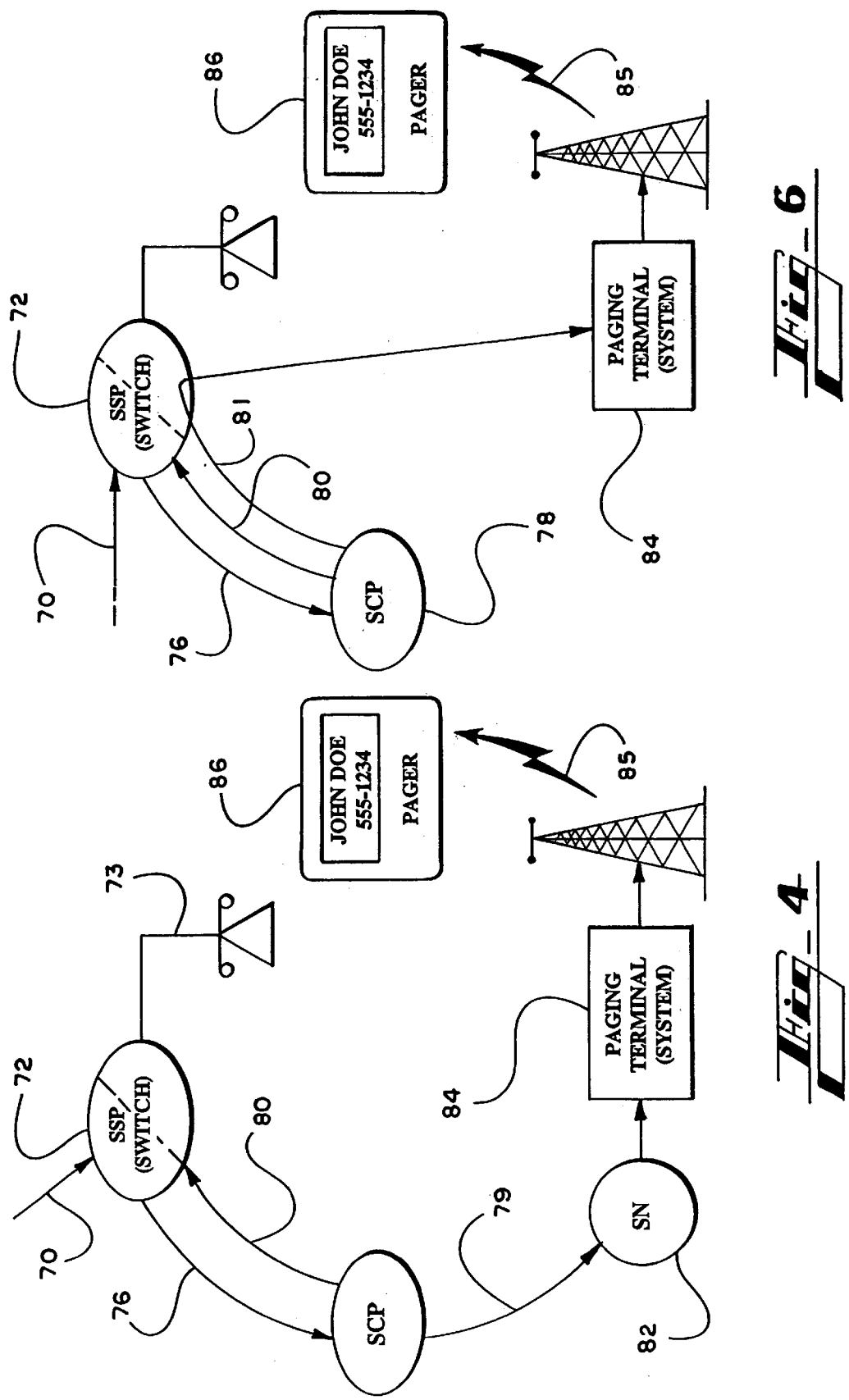

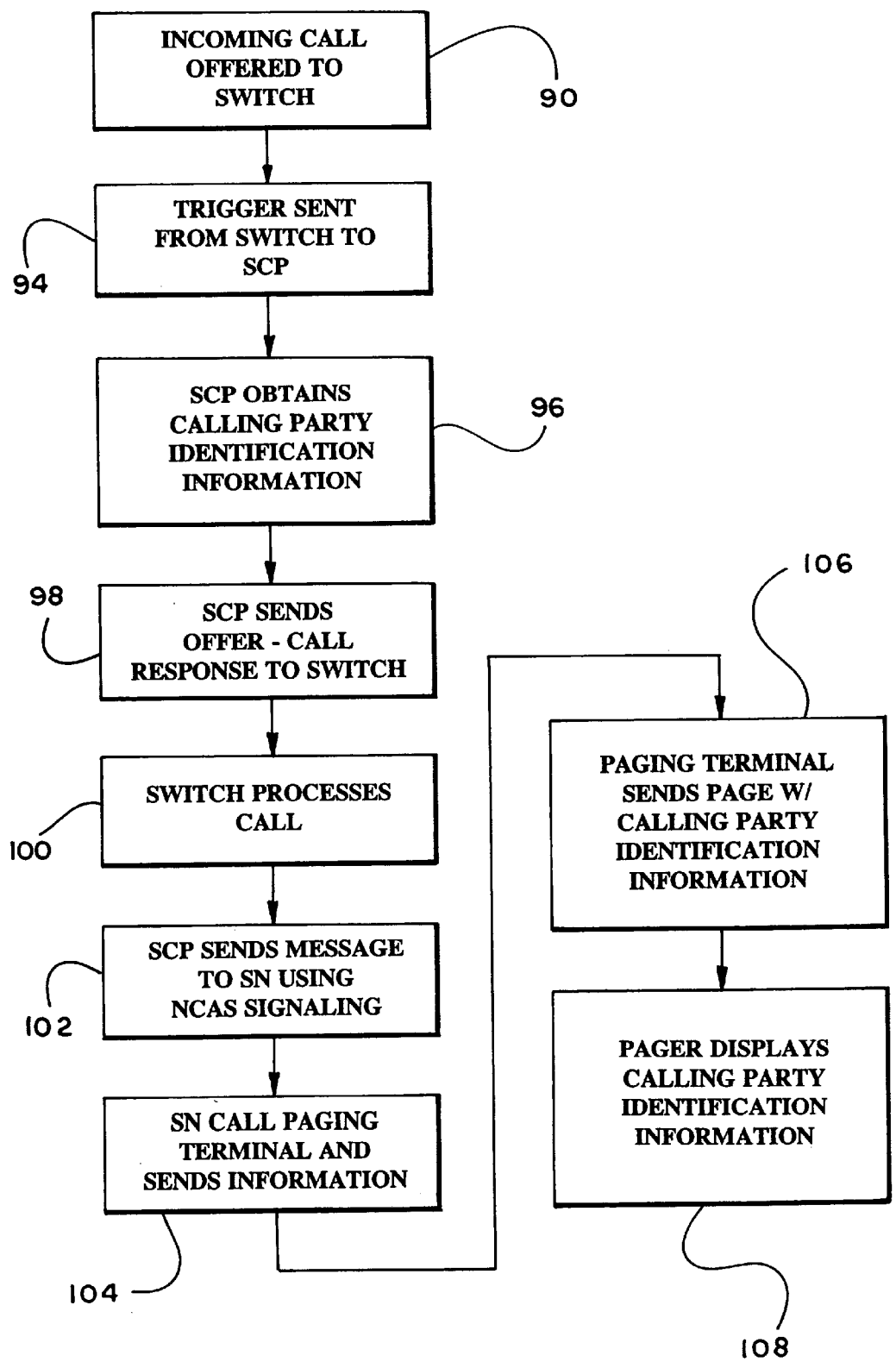

METHOD AND SYSTEM FOR TRANSMITTING CALL RELATED INFORMATION FROM A TELECOMMUNICATIONS NETWORK TO A PAGER

CROSS REFERENCE TO RELATED APPLICATIONS

This invention is a continuation of U.S. application Ser. No. 08/938,249, filed Sep. 26, 1997, now U.S. Pat. No. 6,393,278 which is incorporated herein by reference.

TECHNICAL FIELD

The present invention relates generally to telecommunications and, more specifically, to a method and system for automatically transmitting information related to a previous occurring telephone call to a pager.

BACKGROUND OF THE INVENTION

In recent years, the use of paging systems has greatly increased and pagers are now commonly used by persons in all walks of life. Whether used for business or for personal reasons, one advantage of pagers is that they provide users with the freedom of travel without losing the ability to be constantly linked to a communications network.

Paging systems include a central paging terminal that is connected to various transmitters. Each transmitter sends a paging signal that addresses a particular pager and that can be received by that pager if that pager is located within the radio coverage range of the transmitter. The pager is typically a small device that can be easily carried on the person of the user or placed at a suitable location in close proximity to the user. The pager may include a numeric or alphanumeric display for displaying numeric or text information respectively to the user.

Typically, a pager is associated with a specific telephone number. To page somebody having a pager, a calling party dials the pager's specific telephone number. In addition, a personal identification number (PIN) code may be associated with a pager if a common access number is used for multiple pagers. After dialing this telephone number, the calling party generally may enter numerical information using dual tone multi-frequency (DTMF) signals for indicating numerical information. Typically, such information is the calling party's telephone number so that the person with the pager may call the calling party, i.e., the person who left the page. Other means of signaling such as in-band modem protocols may be used to transfer alphanumeric information with certain types of pagers. Alphanumeric information can be any combination of letters or digits within certain restrictions. After either the numerical or alphanumerical information is entered by the calling party, this information then is transmitted over a paging signal to the appropriate pager.

The appropriate pager detects the paging signal, receives any numerical or alphanumeric information conveyed, and displays the information on a digital display. The pager is also usually designed to notify the paging subscriber that information has been received via audible, visual, or vibration based signals.

Certain services offered by wireline telecommunications networks provide information regarding calls to a subscriber's telephone number and are commonly known as calling line identification services ("Caller ID" services). More specifically, these are calling number delivery services and calling name delivery which provide for the telephone number or name, respectively, associated with the calling party.

These "Caller ID" services generally operate in conjunction with a Caller ID display device that displays the name and/or number of the calling party. The device is usually located in close proximity to the telephone associated with the called telephone number. Such a service is advantageous in that it allows a user to "screen" the call by determining who originated the call. However, such display devices are not mobile as they are usually connected to the telephone line and the telephone set.

Another service offered to subscribers by telecommunications networks is "voice mail" service. Voice mail allows a calling party to leave an audio message when the call is not answered or the called party's line is busy. The called party can then subsequently retrieve the voice mail message left by the calling party. Services such as the voice mail service can be used in conjunction with a paging system to page a subscriber when a voice mail message is left by the calling party. In this manner, the subscriber can be paged and informed that a voice mail message is waiting.

However, current services such as voice mail, that are used in conjunction with a paging system, cause the paging system to notify the user only that a voice mail message exists. The identity of the party who placed the call and left the voice mail message may not be known by the voice mail system, and thus, cannot be transmitted to the paging system and then to the subscriber's pager. Therefore, when the subscriber receives a page indicating the presence of voice mail, the subscriber has no information regarding who left the voice mail message.

It is possible for a subscriber to voice mail service to subscribe to Caller ID services, and thus obtain information pertaining to calls received. In this manner, the voice mail service could obtain information pertaining to calls in which the calling party left a voice mail message. The voice mail service could send this information via a pager to the subscriber. However, such an arrangement requires hardware and software modifications to the voice mail service and presumes that the telephone subscriber is also a voice mail subscriber.

Therefore, the need exists for a method of paging a subscriber with information relating to the identity of the calling party when a particular event occurs, such as a call is place to a specified telephone number or forwarded to voice mail system.

SUMMARY OF THE INVENTION

In general, the present invention is a method and system, in association with a telecommunications network, for paging a subscriber with information pertaining to a call associated with a designated telephone number. A communications service provider, preferably a paging service provider, is provided with information relating to the call, such as the name and/or telephone number of the calling party and the time of the call. The paging service provider then transmits a page including the information relating to the call to the pager of the called party. The pager receives the page and preferably displays the information relating to the call.

More specifically, the present invention is used in association with a telecommunications network and provides for the transmission of information where the information to a pager includes calling party identification information relating to a call made to a designated telephone number. After receiving at a switch a call that is offered from a calling party to a called party, a message is transmitted from the switch to a service control point. Calling party identification information relating to the call is obtained by the service control point. A signal including the calling party identification information is transmitted from the service control point to the switch to instruct the switch to process the call. Another signal including the calling party identification information is transmitted to a paging service provider, which transmits a page including the calling party identification information to a pager associated with the called party. The calling party identification information then may be displayed on the pager.

Advantageously, the present invention, allows a user of telephone service: to be aware of calls made to a telephone number, regardless of whether they were answered, encountered a busy condition, or were forwarded to voice mail, to be aware of the name and number associated with the calling party for such calls and have such information displayed on a pager, to receive such information without having to purchase any additional customer premises equipment or voice mail service in order to receive and display such information.

Therefore, it is an object of the present invention to provide a method and system for paging a subscriber with information relating to a call associated with a designated telephone number.

BRIEF DESCRIPTION OF THE DRAWINGS

FIG. 1 is a block diagram of an exemplary wireline telecommunications network in which the preferred embodiment of the present invention may be implemented.

FIG. 2 is a block diagram showing the signal path in the telephone network for an implementation of paging system.

FIG. 3 is a flow chart illustrating the steps that occur during the operations described in FIG. 2.

FIG. 4 is a block diagram showing the signals transmitted in the telecommunications network for paging a subscriber in accordance with the preferred embodiment of the present invention.

FIG. 5 is a flow chart illustrating the steps that occur during the operations described in FIG. 4.

FIG. 6 is a block diagram showing the signals transmitted in the telecommunications network for paging a subscriber in accordance with an alternative embodiment of the present invention.

DETAILED DESCRIPTION

Turning next to the drawing figures in which like numerals represent like parts, the preferred embodiment will now be described in detail.

Generally, the preferred embodiment provides a method and system for paging a subscriber with information pertaining to a call associated with a designated telephone number. In this description, the person or entity that receives the page is referred to as the paging subscriber. It is anticipated, but not required, that the paging subscriber and the designated telephone number are associated in some manner, e.g., the paging subscriber receives paging information for calls made to the same subscriber's telephone number. An alternative embodiment is that the paging subscriber receives information whenever a call has been forwarded from the designated telephone number to another number, such as a voice mail provider or when a call has encountered a busy condition when offered to the designated telephone number. In these situations, a call is initiated to the paging service provider and information is provided regarding the call to the designated telephone number. The paging system then transmits a page to the appropriate pager. The pager receives the page and displays the information, such as the calling party name and/or number. By this method, the subscriber is informed that a call has been placed to his or her telephone number or that a call has been forwarded to another number, such as a voice mail service provider.

Although the preferred embodiment is described herein with reference to a "subscriber", a "calling party" and a "called party", it should be understood that these terms need not refer only to human operators of telecommunications devices or equipment. It will be appreciated by those skilled in the art that these terms may include devices or equipment, capable of operating without a human operator, that are connected to a telecommunications network. A "call", as described herein, should be understood to refer to an attempt to establish a communications link between a calling party and a called party. A call may be initiated from an originating device either automatically or by a human operator. Also, the "subscriber" of any referenced service may be the user of the service and-is not necessarily the entity with the financial responsibility for services rendered.

FIG. 1 is a block diagram of a typical wireline telephone network in which the preferred embodiment of the present invention may be implemented. The network, generally shown at 10, includes a plurality of central office switches (each called a "switch") and each equipped as a service switching point (SSP) with Advanced Intelligent Network (AIN) capabilities. A plurality of representative SSPs are shown as 12a–12c. Those skilled in the art will recognize that each AIN equipped SSP allows some of the call-processing logic to be removed from the switch and placed in an external device such as a service control point (SCP). Each of the SSPs 12a–12c is equipped with appropriate hardware and software for the activation of AIN triggers which generate messages in response to certain activities on specified telephone lines and for accepting instructions from an SCP. Emanating from each SSP are respective subscriber lines 14a–14c, which are terminated by respective telephone sets 17a–17c. A particular subscriber number (also referred to as a telephone number or directory number) within the network is associated with each of the particular subscriber lines 14. Thus, the SSP is provisioned with the appropriate triggers that result in messages generated to the SCP pertaining to an action or event related to a specific call, such as information identifying the particular subscriber line whenever a call is offered to that line. The nature and format of such triggers is known to those skilled in the art and is specified in the various vendor specifications of AIN procedures, messages, and protocols.

The switches associated with the SSPs 12 communicate with each other through a plurality of trunk circuits 18a and 18b. Data links 22a–c connect SSPs 12a–c, respectively, to a local signal transfer point (STP) 20. These data links use the SS7 protocol, which is well known to those skilled in the art. An STP is a multi-port, high speed switch programmed to direct traffic among the other components in the network.

The local STP 20 is connected through SS7 data link 26 to a local service control point (SCP) 24 of the type well known to those skilled in the art. Service control points contain much of the intelligence necessary to implement the features of the preferred embodiment of the present invention. For example, the SCP 24 contains subscriber databases which correlate subscriber telephone numbers connected to SSPs 12a–c to subscriber names. This is frequently referred to as the "Calling Name Database" by those skilled in the art.

The SCP databases are updated with information provided from a service management system (SMS) 28 via communications path 27. The SMS may also update information on the service node (SN) 30 via communications path 31. Service nodes are well known to those skilled in the art and are implemented by similar types of computers that implement the SCP 24. Service nodes are typically connected to SSPs via an ISDN interface.

While the physical embodiments of the SCP and SN are similar, their functions are different. SCPs normally provide database inquiry and routing services that occur prior to completion of a communication between subscribers. An AIN SCP cannot provide for direct exchange of audible information directly with a telephone user. SNs are typically used to implement actions requiring an audio connection. Thus, services implemented during a call involving sending or exchanging audible information usually require the use of a service node.

FIG. 2 is a block diagram showing the signal paths in the telephone network for a telephone call that has been routed to a voice mail system and which voice mail system pages the subscriber with an indication of a voice mail message being recorded. The incoming call, shown as signal 40, from the calling party is delivered to the SSP, i.e., the switch 42. If the called party does not answer the call, the switch forwards the call 41, to a voice mail service 44 which includes a voice mail box associated with the called party's telephone number. At this point, the voice mail service prompts the calling party to leave a message. The calling party may leave an audio voice mail message for the called party. The message is stored by the voice mail service 44 in the voice mail box associated with the called party's telephone number.

After the voice mail service 44 stores the calling party's voice mail message, the voice mail service may initiate a call to the paging service 46. The voice mail service 44 then sends information to the paging service provider indicating the presence of voice mail message which is to be sent to the pager. The paging service 46 (for example, through use of a paging terminal) then transmits a page 47 to the pager 48 associated with the called telephone number, as determined from a database located at the paging terminal.

The page 47 sent by the paging system may be a tone-only page, or contain some predetermined digits to inform the called party that a voice mail message has been left on the called party's voice mail service. The predetermined digits typically are in the form of a seven digit telephone number, such as "777-7777", which is a number set by the paging service provider to be displayed on the pager to inform the called party of the existence of a voice mail message. In this manner, the called party knows that a voice mail message has been left by a calling party, but does not know anything else about the voice mail message. For example, the called party does not know the name of the party who left the voice mail message.

The description above with reference to FIG. 2 is summarized in the flow chart of FIG. 3. The incoming call from the called party is offered to the switch at step 50. The switch then forwards the call to the called party's voice mail box at step 52. The calling party then leaves a voice mail message at step 54. At step 56, the voice mail service initiates a call to the paging system and sends information indicating the presence of a voice mail message. The paging service transmits a page to the pager associated with the called number at step 60 to notify the called party that a voice mail message is present in the called party's voice mail box.

The exemplary system and method of paging a called party upon receipt of a voice mail message, as described in FIGS. 2 and 3, only provides information that a voice mail message exists, but does not provide any other information such as the name the calling party that left the message.

The present invention provides information relating to a call as described with reference to FIG. 4. That describes the preferred embodiment of the present invention which shows the signaling paths associated with the provision of calling party name and number information to a subscriber's pager. In FIG. 4, an incoming call 70 from the calling party to the telephone number of the called party is offered to an AIN capable switch. The switch is provisioned with an AIN trigger known as termination attempt trigger ("TAT") associated with the called party line 73. Any call attempts to the called party number will result in a "termination attempt" message 76 to be sent to the SCP 78.

The SCP is then provided with information regarding the telephone number of the calling party. The SCP may also contain the "Calling Name Database" which has information of telephone numbers and names associated. If SCP 78 does not have this information it may access it from other SCP databases. The databases from which calling party information is obtained include the names and telephone numbers of the subscribers connected to the network. Such a database may include many millions of entries that are updated automatically on a daily basis, thus providing an accurate listing of calling party identification information.

After the SCP 78 is provided the call related information, the SCP responds to the switch with an instruction to process the call in a normal fashion. This instruction is preferably in the form of an "Offer_Call" message 80. The Offer_Call message is a standard response to the SSP. Other types of responses to the switch may include a request to be notified via a subsequent message if the call is forwarded due to a busy or no-answer condition. The switch then continues processing the call in a conventional manner.

The SCP 78 then preferably sends a message 79 to the SN 82 indicating the information relating to the call. The message 79 from the SCP to the SN may include the calling party name, the calling party telephone number, the time of the call, the called party telephone number, as well as the telephone number associated with the called party's pager and personal identification number (PIN) code associated with the pager number, if required. The SN then places a call to the paging terminal 84 relaying the call related information to the paging service provider. The call from the SN to the paging system may use an in-band modem protocol and/or DTMF tones for transferring information pertaining to call 70. The paging terminal 84 then transmits a page 85 containing the information sent by the SN pertaining to call 70 to the pager 86 of the called party. The page 85 notifies the called party that a call was offered to the called party's telephone number and provides call related information such as the name and/or number of the calling party. This information is preferably displayed on the pager. In this manner, upon receiving the page, the paging subscriber is made aware of a call attempt to his or her telephone and the associated call related information.

The message 79 from the SCP to the SN is a non-call associated signaling (NCAS) message. NCAS messages, used in accordance with the present invention, are described in U.S. Pat. No. 5,499,290 entitled "AIN NON-CALL ASSOCIATED SIGNALING FOR SERVICE NODES AND SERVICE CONTROL POINTS IN A TELEPHONE SYSTEM", issued on Mar. 12, 1996 and assigned to BellSouth Corporation of Atlanta, Ga., assignee of the present invention. The disclosure contained in U.S. Pat. No. 5,499, 290 is herein incorporated by reference. The NCAS signaling protocol allows communication between a network element, such as a SCP containing a database, through a switch to a device attached to the network, such as a computer, a paging terminal, a mobile telephone switching office (MTSO) associated with a cellular telecommunications network, a base station, customer premises equipment (CPE), or other similar equipment.

In the description of FIG. 4, it should be understood that the paging system 84 is not implemented with the NCAS interface and thus cannot receive direct NCAS messages from the SCP 78. Therefore, in the embodiment the message from the SCP with call related information is first sent to the SN, which is an AIN computer familiar with the paging system's signaling protocols. Thus, the SN communicates the called party information, obtained from the SCP, to a paging system that is not equipped to handle NCAS messages. This is particularly advantageous because it allows information to be transmitted to the paging system without the need to modify the paging terminal or other equipment.

The description of the preferred embodiment with reference to FIG. 4 is summarized with respect to preferred operational steps in the flow chart of FIG. 5. At step 90, the incoming call from the calling party is offered to the switch for a designated called party. Then, at step 94, a "termination attempt trigger" ("TAT") is encountered resulting in a termination attempt message sent from the switch to the SCP that notifies the SCP that a call has been offered to the designated number along with the calling party's number. The SCP then obtains call related information such as calling party identification information at step 96 from a database contained within the SCP or another network database.

The SCP responds to the switch, at step 98, with an instruction to offer the call, i.e., to continue processing of the call, which the SSP performs at step 100. At step 102, the SCP sends an NCAS message to the SN including the call related information. The SN, at step 104, then calls the paging system and transmits the calling party information. The paging system then sends out a page to the called party's pager containing the information, at step 106. Upon receipt of the page, the called party's pager, at step 108, displays a message that notifies the called party that a call has been placed to the designated called party number. The pager also preferably displays the calling party's name and telephone number.

An alternative implementation of the description of FIGS. 4 and 5 is described with reference to FIG. 6. The signaling paths described in FIG. 6 are the same as that of FIG. 4, but with an exception. In this implementation, the paging system is compatible with the NCAS interface. Therefore, the paging system is capable of receiving NCAS messages directly from the SCP. In this alternative implementation, the SCP 78 sends an NCAS message 81 directly to the paging system 84 via the switch 72 rather than through a SN, as shown in FIG. 4. With reference to the flow chart of FIG. 5, if the paging system is NCAS-compatible as the implementation illustrated in FIG. 6, steps 102 and 104 are replaced by a single step in which the SCP sends an NCAS message containing call related information to the paging terminal.

Although the preferred embodiment of the present invention is described in relation to a telephone call that has been offered to a designated telephone number, it should be understood that the present invention can be utilized in various other situations. For example, the SSP can be provisioned with other types of AIN triggers which result in messages being sent to the SCP only if the calls to the designated number encounter a busy or no answer condition. These are referred to as the "T_Busy" and "T_No_Answer" triggers respectively by those skilled in the art. This allows the subscriber to be paged only if a call to a designated telephone number encounters a busy or no-answer condition as opposed to being paged for every call offered to the designated telephone number.

A still further option would be to provision the AIN trigger at the switch based not on the termination of an incoming call to a designated called party, but rather on the origination of a call from a designated party. For example, receipt at the switch of an "off-hook" condition on a calling party's telephone line could be used to initiate a message from the switch to the SCP. Such an implementation would page the subscriber of the telephone line when a call attempt originates from the telephone line. Such an implementation would be advantageous in a situation such as where the telephone line is a dedicated alarm line. In this manner, a subscriber is paged when a call is attempted from the telephone line, and could indicate an alarm condition at the subscriber premises. It will be understood by those skilled in the art that many other situations exist for which other AIN triggers can be encountered and although the preferred embodiment of the present invention is described herein with reference to a call offered to a telephone number, the present invention can be implemented for many alternative situations.

In association with the present invention, call related information may be sent from the SCP using the IS-41 protocol or other methods to a message center other than a conventional paging system or paging service provider. Such a message center may be associated with the "short message service" provided by a digital cellular or personal communications service (PCS) telecommunications network for transmission to a wireless mobile telephone having an alphanumeric display. Thus, the present invention is contemplated to be capable of being utilized to transmit calling party identification information to personal communications services (PCS) cellular telephones or digital cellular telephones in a cellular telecommunications network which utilize a capability known as "Short Messaging Service" , as is well known to those skilled in the art.

From the foregoing it will be appreciated that the disclosed embodiments of the present invention overcome the drawbacks of the prior art described hereinabove and accomplish the previously stated objects of the present invention. From the description of the alternate preferred embodiments, equivalents of the elements shown therein will suggest themselves to those skilled in the art. For example, equivalent ways of constructing and implementing other embodiments of the present invention will suggest themselves to practitioners of the art. Therefore, the scope of the present invention is to be limited only by the claims below.

What is claimed is:

1. In association with a telephone network including a switch equipped as a service switching point and a service control point, a method for transmitting information to a wireless communications device, comprising:

at the switch,
   receiving a call to a called party;
   transmitting a first message to the service control point notifying the service control point of the call at a predetermined time;
at the service control point,
   retrieving calling party identification information;

transmitting a first signal to the switch to process the call;

transmitting a second signal to a wireless service provider including the calling party identification information so that the calling party may be identified; and transmitting a second message including the calling party identification information via the wireless service provider to a wireless communications devices.

2. The method of claim 1 further compromising displaying the calling party identification information on an alphanumeric display on the wireless communications device.

3. The method of claim 1 wherein the second signal transmitted to the wireless service provider uses a signaling protocol.

4. The method of claim 1 wherein the calling party identification information includes the name of the calling party.

5. The method of claim 1 wherein the calling party identification information includes the telephone number of the calling party.

6. The method of claim 1 wherein the calling party identification information includes the time at which the incoming call was made.

7. The method of claim 1 wherein the calling party identification information is retrieved by the service control point from a database that includes the names and phone numbers associated with a plurality of subscribers.

8. The method of claim 1 wherein transmitting the second signal to the wireless service provider comprises first transmitting the calling party identification information from the service control point to a service node using NCAS signaling, and then transmitting the calling party identification information from the service node to the wireless service provider.

9. The method of claim 1 wherein the wireless service provider comprises a cellular telecommunications network.

10. The method of claim 1 wherein the wireless service provider comprises a personal communications service (PCS) telecommunications provider utilizing a short message service.

11. The method of claim 1 wherein the predetermined time is when an incoming call is offered to the switch.

12. The method of claim 1 wherein the predetermined time is when an incoming call is routed to a voice mail service.

13. A system for transmitting information to a wireless communications device, comprising:

a telecommunications network comprising a switch and a service control point operatively connected to said switch; and said telecommunications network being operative to:

receive, at the switch, a call offered from a calling party to a called party;

transmit a message from the switch to the service control point notifying the service control point of the call at a predetermined time during the processing of the call;

retrieve calling party identification information at the service control point;

transmit a first signal from the service control point to the switch to instruct the switch to process the call;

transmit a second signal to a wireless service provider including the calling party identification information so that the calling party may be identified; and transmit a page including the calling party identification information via the wireless service provider to a wireless communications device.

14. The system of claim 13 wherein the wireless communications device displays the calling party identification information on an alphanumeric display.

15. The system of claim 13 wherein the second signal transmitted to the wireless service provider uses a signaling protocol.

16. The system of claim 13 wherein the calling party identification information includes the name of the calling party.

17. The system of claim 13 wherein the calling party identification information includes the telephone number of the calling party.

18. The system of claim 13 wherein the calling party identification information includes the time at which the incoming call was made.

19. The system of claim 13 wherein the calling party identification information is retrieved by the service control point from a database that includes the names and telephones numbers associated with a plurality of subscribers.

20. The system of claim 13 wherein the second signal transmitted to the wireless service provider is first transmitted from the service control point to a service node using a signaling protocol, and then transmitted from the service node to the wireless service provider.

21. The system of claim 13 wherein the wireless service provider is a cellular telecommunications network.

22. The system of claim 13 wherein the predetermined time is when an incoming call is offered to the switch.

23. The system of claim 13 wherein the predetermined time is when an incoming call is routed to a voice mail service.

24. A method for transmitting information to a wireless communications device operating in a telecommunications network with a switch configured to operate in conjunction with a service switching point and a service control point, the method comprising:

receiving a call at the switch;

notifying the service control point;

retrieving calling party identification information at the service control point;

instructing the switch to process the call;

notifying a wireless service provider with the calling party identification information; and transmitting a message including the calling party identification information via the wireless service provider to the wireless communications device.

25. The method of claim 24, wherein the wireless service provider comprises a message center associated with a short message service.

26. The method of claim 24, wherein transmitting a message including the calling party identification information via the wireless service provider to the wireless communications device comprises sending calling party identification information via an IS-41 protocol.

27. The method of claim 24, wherein the call comprises an indication of an off-hook condition of a calling party's telephone line.

28. A method for transmitting information to a wireless communications device operating in a telecommunications network with a switch configured to operate in conjunction with a service switching point and a service control point, the method comprising:

receiving a first call at the switch;

routing the first call to a voice mail service;

receiving a message at the voice mail service;

initiating a second call to a wireless communications device to indicate the presence of the message with the voice mail service; and notifying the wireless communications device that the message with the voice mail service exists.

29. The method of claim 28, wherein at least one of the first call and the second call comprises an indication of an off-hook condition of a calling party's telephone line.

30. The method of claim 28, wherein the voice mail service comprises a voice mail box associated with a called party.

31. The method of claim 28, wherein the wireless communications device comprises at least one of the following: a pager, a cellular phone, a personal communications services device, a digital cellular phone, a short messaging service devices.

32. The method of claim 28, wherein initiating the second call to a the wireless communications device to indicate the presence of the message with the voice mail service comprises the voice mail device sending a signal to a wireless communications service provider.

33. The method of claim 28, wherein notifying the wireless communications device that the message with the voice mail service exists comprises sending a message that further comprises information relating to a at least one of the first call and the second call.

* * * * *